Patented Feb. 16, 1937

2,070,636

UNITED STATES PATENT OFFICE 2,070,636

POWER TRANSMISSION DEVICE

De Witt E. Yates, Chippewa Falls, Wis., assignor to W. S. Darley & Co., Chicago, Ill., a corporation of Illinois Application October 24, 1934, Serial No. 749,717

11 Claims. (Cl. 192—69)

This invention relates to improvements in power transmission units, and has particular reference to a device adapted for attachment to, for example, the front end of an automobile, as an auxiliary pump, although it is obvious that the same may be driven by any form of motive power; the principal object being to produce a more efficient, simple, and durable device of this character than heretofore known, and one especially free from the damaging effects of excess vibration.

Another object is to provide simple means to counterbalance the end thrust of the impeller of the pump.

Another object of this invention is to provide an improved power transmission unit comprising a combined clutch mechanism and universal coupling.

A still further object is to provide an improved power transmission unit wherein clutch and universal coupling elements are combined in a small space and arranged for efficient operation and ease of control.

Still other objects and advantages of the invention will appear in the following description thereof.

Referring now to the accompanying drawings, forming part of this application, and wherein like reference characters indicate like parts:

Figures 1, 2:
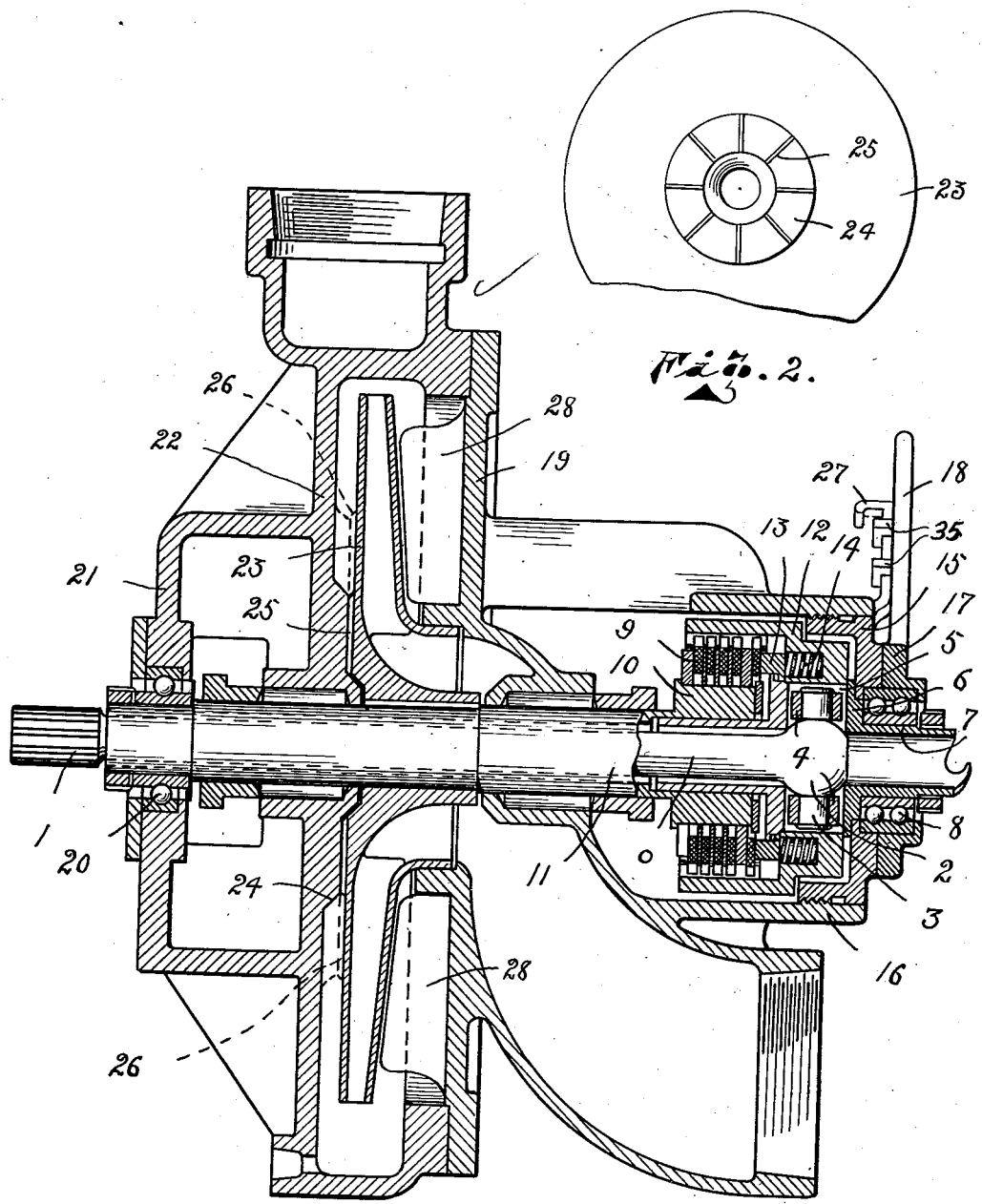
Figure 1 is a central sectional view, partly in elevation of my improved power transmission unit as applied to a centrifugal pump.
Figure 2 is a broken side elevation of the back of the impeller of the pump.
Figure 3:
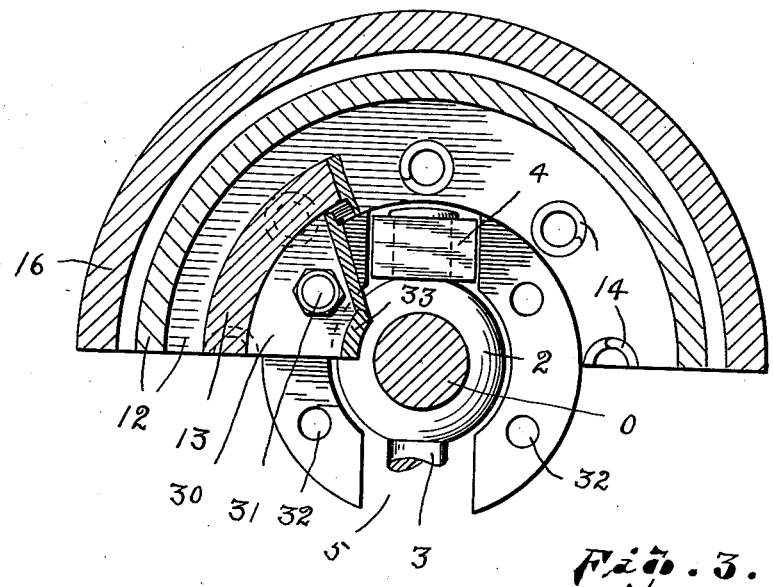
Figure 3 is an enlarged fragmental sectional view on the line 3—3, Figure 4, showing portions of the members broken obliquely to better illustrate their cooperative relation.
Figure 5:
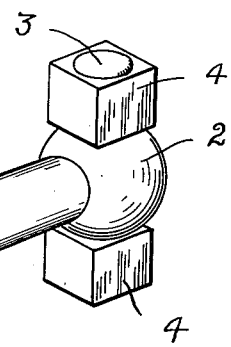
Figure 5 is a perspective view of the universal joint end of the shaft O.

In the drawings the numeral 1 represents the inner end of the drive shaft O of the pump, and it may be connected with the forward end of the drive shaft of an automobile, or other source of power, as by a universal joint or coupling, not shown, but of any desired construction, the same being common in such devices. The shaft O continues axially through the pump to the enlarged head-like portion 2 provided with the integrally formed radially disposed members or pintles 3, upon which are freely rotatably mounted the square nuts 4, they being confined within the rectangular recesses 5, formed within the head portion of the coupling. The head portion is actuated by the cap 15—17 when the lever 18 is operated and comprises the two members 6 and 12, that portion of the member 6 upon either side of the opposed openings 5 fitting within the hub-like portion of the member 12 and fixed thereto as by suitable keys or pins not shown, so that the two members operate as a unit and rotate at all times with the shaft O. To the portion 6 of the coupling is integrally formed the sleeve like member 7 having its outer terminal properly shaped for the reception of a crank in starting the rotation of the vehicle engine, or other driving power, when necessary. This forwardly extending portion of the coupling is mounted within the double ball thrust and radial bearing 8.

A common multiple disc clutch is illustrated at 9, the circumferentially cogged discs of which are carried upon the hub-like portion 10 of the hollow driven shaft 11 and mesh with the internally geared surface of the head portion 12. The construction of such a clutch is well known in the art and a detailed description of the same is therefore not considered necessary, except to state that the outer housing or head portion of the same, indicated at 12—6, previously described, is provided with a spring controlled pressure ring 13, engaging the discs and against which ring the springs, indicated at 14, assembled within circumferentially arranged holes in the member 12, impinge, so as to impart yielding stress to the discs of the clutch and to insure the continued initial pressure applied thereto when the clutch is adjusted to driving position. It will be understood that the sleeved disc 30 is held in permanent relation with the members 6—12 by the bolts 31 screw threadedly mounted within holes 32 in the hub-like portion of the member 6 which extends within the member 12, and the sleeved portion 33 of the disc 30 extends backwardly and rotatably within the hub-like portion 10 of the clutch to form a more substantial bearing for said members.

The adjustment of the clutch is accomplished in this instance, and which is deemed novel, by the rotation of the externally screw threaded cap 15 within the internally screw threaded hub-like portion 16 of the pump casing. The cap 15 is surmounted by the removable auxiliary cap 17 which carries the control lever 18 of the clutch. This latter cap also surmounts the ball bearing 8, and, together with the cap 15, insures a positive mounting for the ball bearing 8 in the hub portion 16 of the back plate 19 of the pump housing; it being understood that the two portions 15 and 17 are firmly fixed together by means of suitable tap or through bolts shown at 34 in Figure 4 of the drawings, there being four of such bolts, a pair upon either side of a central vertical line, thus not appearing in Figure 1.

Figure 4:
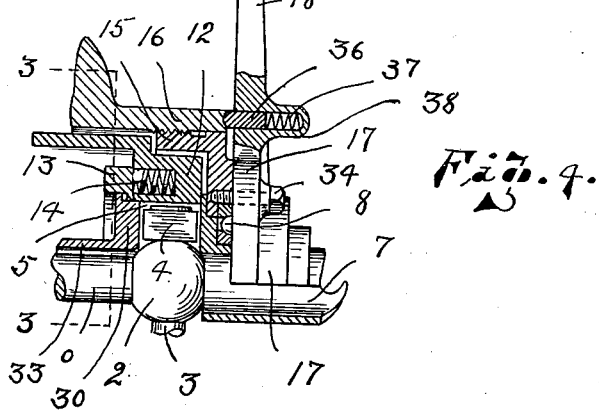
Figure 4 is a fragmental vertical sectional view through the control lever, showing portions of the head of the combined clutch and universal joint in perspective to better illustrate the connecting bolts of the parts thereof, and a modified form of lever catch.

By this construction it is evident that rocking motion of the handle 18 will adjust the cap 15—17 either to or from the clutch axially, and, of course, carry with it the bearing 8 which permits free rotation of both drive and driven units by virtue of said bearing. The rotation of the cap member 15—17 is accomplished by the lever 18 formed integral with the auxiliary portion 17 of said cap, and I have shown at 27 a catch manually slidable longitudinally beneath two staple like members 35 fixed to the lever, and which catch selectively cooperates with notches not shown in the outer circumferential face of the hub-like portion 16; this form of latch being shown in Figure 1 of the drawings, while a modified form, if preferred, is illustrated in Figure 4 of the drawings, and includes a simple plunger 36, urged forwardly by the expansive spring 37 in the tit-like housing 38 near the base of the lever; both of which devices are common in lever control mechanism and form no part of my present invention.

The interior of the hollow shaft 11 is considerably greater in diameter than that portion of the drive shaft extending therewithin, so as to provide for misalignment of the pump and free action of the universal coupling, and the opposite innermost end of the shaft 11 is preferably stepped and provided with the ball bearing 20 and thus rotatably mounted within the extension 21 of the pump head 22.

The impeller of the pump is illustrated at 23 and is mounted preferably upon a stepped portion of the shaft 11, upon either side of which are suitable stuffing box glands as is common. It is well known that a hollow disc like impeller of this type with the intake in the hub thereof about the shaft, is subject to abnormal end thrust on the shaft due to the greater area subject to water pressure on the back of the impeller. To overcome this end thrust to a certain extent and reduce the thrust against the ball bearing 8, the impeller is provided with a hub-like extension indicated at 24, (see Fig. 2), about the countersunk area concentric with the axis of the impeller, and in which hub-like extension are formed radially disposed slots or channels 25, they being for the purpose of carrying water about with them when the impeller is rotated thereby setting up centrifugal action which counteracts the pressure otherwise imparted to the impeller as thrust. It is obvious that in lieu of the grooves 25, more extensive vanes disposed radially upon the back of the impeller as indicated in dotted lines at 26 may be employed for the same purpose, and in which event the hub-like extension of the housing would obviously have to conform to the diameter of said vanes; or pressure may be increased upon the opposite side of the impeller by radially disposed vanes projecting from the interior of the housing, as indicated at 28, to prevent centrifugal action of the water.

From the foregoing it is evident that I have provided an exceptionally compact driving and controlling mechanism for a centrifugal pump, wherein ample provision is made for any misalignment of the pump in respect to the initial driving shaft, and that without the necessity of but slightly more room axially of the pump than that required by it initially.

While I have illustrated this novel mechanism as applicable to a pump for operating same in the least space longitudinally of the drive shaft, it is evident that a pulley or gear mechanism may be similarly operated, thus deriving all of the benefits of concentration of the mechanism, simultaneously with ample provision for taking up or counteracting any misalignment of the parts, which, in other forms of constructions, require objectionable length axially of the mechanism.

Having thus described my invention, what I claim and desire to secure by Letters Patent, is:

1. In a power transmission unit, a drive shaft and a driven shaft, clutch means comprising a member connected to said driven shaft and a slidably supported member, means comprising rigid directly contacting elements for universally coupling said slidably supported member to said drive shaft, and means in engagement with said slidably supported member for actuating said clutch.

2. In a power transmission unit, a drive shaft and a driven shaft, clutch means surrounding one of said shafts and comprising a member connected to said driven shaft and a slidably supported member, means comprising rigid diametrically extending elements associated with said drive shaft for universally coupling said slidably supported member to said drive shaft, and means in engagement with said slidably supported member for actuating said clutch.

3. In a power transmission unit, a drive shaft and a driven shaft surrounding said drive shaft, clutch means comprising a member connected to said driven shaft and a slidably supported member, means comprising an enlargement associated with said drive shaft and having rigid diametrically extending elements for universally coupling said slidably supported member to said drive shaft, and means in engagement with said slidably supported member for actuating said clutch means.

4. In a power transmission unit, a drive shaft and a driven shaft surrounding said drive shaft, means intermediate said shafts for optionally connecting said drive and driven shafts comprising a universal coupling having a driving element comprising rigid diametrically extending members positively connected with said drive shaft and a driven element supported for sliding movement, said means further comprising a clutch mechanism between said driven shaft and said driven element and means engaging said driven element for slidably moving said element thereby actuating the clutch mechanism.

5. In a clutch mechanism, the combination of a hollow driven shaft connected to one side of the clutch mechanism, a slidably and rotatably supported member associated with the other side of said clutch, a drive shaft positioned within said driven shaft, universal coupling means comprising rigid diametrically extending elements for connecting said drive shaft with said member, and means engaging said member for actuating the clutch mechanism.

6. In a power transmission unit, a drive shaft and a driven shaft surrounding said drive shaft, means intermediate said shafts for optionally connecting said drive and driven shafts, a casing for enclosing said means having a threaded portion, said means comprising a clutch device having a member connected to said driven shaft and a slidably mounted member universally coupled to said drive shaft, and means comprising a movable threaded member coacting with said threaded portion for actuating said first said means.

7. In a clutch mechanism, the combination of a casing for enclosing said clutch mechanism having a threaded end portion, a driven shaft positively connected to one side of the clutch mechanism, a slidably and rotatably supported member associated with the other side of said clutch mechanism, a drive shaft and universal coupling means for connecting said drive shaft with said member, and means comprising a movable threaded element coacting with said threaded end portion for sliding said member upon movement of said element whereby said clutch mechanism will be actuated.

8. In a clutch mechanism, the combination of a casing for enclosing said clutch mechanism having a threaded end portion, a hollow driven shaft connected to one side of the clutch mechanism, a slidably and rotatably supported member associated with the other side of said clutch mechanism, a drive shaft positioned within said driven shaft, universal coupling means for connecting said drive shaft with said member, and means comprising a movable threaded element coacting with said threaded end portion for sliding said member upon rotation of said element whereby said clutch mechanism will be actuated.

9. In a power transmission unit, a drive shaft and a driven shaft surrounding said drive shaft, means intermediate said shafts for optionally connecting said drive and driven shafts, a casing for enclosing said means having a threaded end portion, said means comprising a universal coupling having a driving element connected with said drive shaft and a driven element supported for sliding movement, said means further comprising a clutch mechanism connected between said driven shaft and said driven element, and means comprising a movable threaded member coacting with said threaded end portion for sliding said driven element upon rotation of said member whereby said clutch will be actuated.

10. In a power transmission unit, a drive shaft and a driven shaft surrounding said drive shaft, a power receiving instrumentality operable by said driven shaft, means intermediate said shafts for optionally connecting said drive and driven shafts, said means comprising a plurality of radially disposed pintles supported by said drive shaft and a slidably and rotatably mounted member having recesses for receiving said pintles whereby said member is rotated by said drive shaft, and clutch means positioned between said member and said driven shaft for driving said power receiving instrumentality by said member.

11. In a power transmission unit, a drive shaft and a driven shaft surrounding said drive shaft, a power receiving instrumentality operable by said driven shaft, means intermediate said shafts for optionally connecting said drive and driven shafts, said means comprising a plurality of radially disposed pintles on each of which is movably mounted a rectangular nut and a slidably and rotatably supported member having recesses into which the said rectangular nuts are adapted to be positioned whereby said member is connected to said drive shaft, said means further comprising clutch elements, one of which is positively connected to the said driven shaft and the other element is associated with said member, and means for slidably positioning said member to cause engagement of the clutch elements whereby said power receiving instrumentality will be driven by said drive shaft.

DE WITT E. YATES.